(12) United States Patent
Nakamura (10) Patent No.: US 7,949,187 B2
(45) Date of Patent: May 24, 2011

(54) CHARACTER STRING RECOGNITION METHOD AND DEVICE

(75) Inventor: Hiroshi Nakamura, Nagano (JP)

(73) Assignee: NIDEC Sankyo Corporation, Nagano (JP)

( * ) Notice: Subject to any disclaimer, the term of this patent is extended or adjusted under 35 U.S.C. 154(b) by 1090 days.

(21) Appl. No.: 11/693,139

(22) Filed: Mar. 29, 2007

(65) Prior Publication Data

US 2007/0230784 A1 Oct. 4, 2007

(30) Foreign Application Priority Data

Mar. 30, 2006 (JP) ................................ 2006-094497

(51) Int. Cl.
G06K 9/34 (2006.01)
G06K 9/38 (2006.01)
G06K 9/18 (2006.01)
G06K 9/00 (2006.01)
G06K 15/02 (2006.01)
H04N 1/40 (2006.01)

(52) U.S. Cl. ........ 382/177; 382/171; 382/172; 382/174; 382/185; 382/187; 382/188; 358/3.31; 358/1.11

(58) Field of Classification Search .................. 382/174, 382/177, 171, 172, 185, 187, 188; 358/1.11, 358/3.31

See application file for complete search history.

(56) References Cited

U.S. PATENT DOCUMENTS

| | | | | |
|---|---|---|---|---|
| 4,827,529 A * | 5/1989 | Peppers et al. | ................ | 382/174 |
| 5,034,991 A * | 7/1991 | Hagimae et al. | ............... | 382/209 |
| 5,062,141 A | 10/1991 | Nakayama et al. | | |
| 5,357,582 A * | 10/1994 | Lin | ............................... | 382/174 |
| 5,613,017 A * | 3/1997 | Rao et al. | ....................... | 382/174 |
| 5,889,884 A * | 3/1999 | Hashimoto et al. | ............ | 382/168 |
| 6,327,384 B1 * | 12/2001 | Hirao et al. | .................... | 382/173 |
| 6,535,619 B1 | 3/2003 | Suwa et al. | | |
| 7,302,098 B2 * | 11/2007 | Tang et al. | ..................... | 382/177 |

FOREIGN PATENT DOCUMENTS

| | | |
|---|---|---|
| JP | 03-015995 | 1/1991 |
| JP | 05-073722 | 3/1993 |
| JP | 05-120483 | 5/1993 |
| JP | 11-272803 | 10/1999 |

* cited by examiner

*Primary Examiner* — Vu Le
*Assistant Examiner* — Soo Jin Park
(74) *Attorney, Agent, or Firm* — Frommer Lawrence & Haug LLP

(57) ABSTRACT

A character string recognition method for recognizing a character string may include a first step in which a first projection data of image data are calculated in a direction of the character string and a second step in which a position of the character string is detected on the basis of the first projection data. In the first step, the image data are divided into a plurality of segments in the direction of the character string and projection in the segment is calculated. The method may further include a third step in which a second projection data in the segment are calculated on the basis of the position of the character string and a fourth step in which a position where the second projection data exceeds a threshold value is detected as a boundary position of a character, and the threshold value may be changed according to pixel number between both ends of the character string.

4 Claims, 9 Drawing Sheets

P<JPNSANKYO<<HANAKO<BCDEFGILMQRTUVWXYZ<<<<<<
0987654326JPN8503172F1210082<<<<<<<<<<<<<6

```
P<JPNSANKYO<<HANAKO<BCDEFGILMQRTUVWXYZ<<<<<<
0987654326JPN8503172F1210082<<<<<<<<<<<<<<6
```

CHARACTER STRING RECOGNITION METHOD AND DEVICE

CROSS REFERENCE TO RELATED APPLICATION

The present invention claims priority under 35 U.S.C. §119 to Japanese Application No. 2006-94497 filed Mar. 30, 2006, which is incorporated herein by reference.

BACKGROUND OF THE INVENTION a) Field of the Invention

The present invention relates to a character string recognition method and a character string recognition device for optically reading a character string on a medium such as paper or plastic. Specifically, the present invention relates to a character string recognition method and device that are capable of preventing from reducing recognition accuracy.

b) Background of the Related Art

Character string recognition devices for recognizing a character string which is printed on a surface of a medium such as a check have been conventionally known. For example, a character recognition device which is disclosed in Japanese Patent Laid-Open No. Hei 05-120483 includes a character cutout means which detects a character portion from binarized image data and cuts out the character portion along a circumscribing rectangular frame, a feature vector extraction means which extracts a feature vector from a character pattern obtained by the character cutout means, a feature storage means which has stored features for every character in advance, a similarity computing means which obtains a similarity of the feature vector of the inputted pattern with reference vectors for every character in a feature dictionary, a candidate character selecting means which selects a candidate character on the basis of a degree of similarity obtained by the similarity computing means, and a similar character recognition means which recognizes in detail when a plurality of candidate characters are selected by the candidate character selecting means. According to the character recognition device having the structure as described above, a character string printed on a surface of a medium can be recognized.

The binarized image data described above are obtained by an optical sensor for optically reading a character string printed on a medium. Specifically, from a viewpoint of reducing a manufacturing cost, it has been known to often use a CCD line sensor (one-dimensional imaging element) for optically reading a character string one-dimensionally (see, for example, Japanese Patent Laid-Open No. Hei 05-73722). In this case, a main scanning on the character string on the medium is performed by the CCD line sensor and a sub-scanning is performed by medium movement based on a manual operation or a mechanical drive operation. In this manner, two-dimensional image data of the character string are obtained by mutual operations of the CCD line sensor and the medium movement and then the two-dimensional image data are binarized and the binarized image data described above are obtained.

However, there is a problem that a high degree of recognition accuracy is not attained in the latter conventional character recognition device described above.

Specifically, in a manual type card reader, when a medium carrying speed varies due to a manual operation (swipe operation in a swipe type card reader) to cause distortion of image to occur in a medium carrying direction, distortion of image may simultaneously occur in a direction perpendicular to the medium moving direction (for example, image may be inclined or waved). Further, distortion of image may occur in the direction perpendicular to the medium moving direction even when an under face of the medium is floated from a carrying passage face in an imaging device (character recognition device). In this case, since a direction of the image distortion is a direction perpendicular to the medium moving direction, it is difficult to correct the distortion. For example, in the latter conventional character recognition device, an image distortion in the medium moving direction can be corrected but, when the image distortion is a direction perpendicular to the medium moving direction, correction is difficult. As a result, when cutting-out for characters is performed by using the distorted image, recognition accuracy may be reduced.

OBJECT AND SUMMARY OF THE INVENTION

In view of the problems described above, the primary object of the present invention is to advantageously provide a character string recognition method and a character string recognition device which are capable of preventing reduction of accuracy of character string recognition even when image distortion occurs in a direction that is perpendicular to the medium moving direction.

Thus, according to an embodiment of the present invention, a character string recognition method and a character string recognition device may be provided as described in the following examples.

FIRST EXAMPLE

A first character string recognition method for recognizing a character string comprises the steps of:

imaging a character string on a medium to obtain image data;

a first step in which a first projection data of the image data are calculated in a direction of the character string while shifting in a perpendicular direction which is perpendicular to a direction of the character string; and a second step in which a position of the character string in the perpendicular direction is detected on a basis of the first projection data which is obtained through the first step;

wherein, in the first step, the image data are divided into a plurality of segments in the direction of the character string and then the first projection data in the segment are calculated.

According to the first example, the character string recognition method for recognizing a character string on a medium includes a first step and a second step. In the first step, a first projection data of image data are calculated in a direction of the character string (for example, in a medium carrying direction when a medium is carried in a direction of the character string) while pixel number is shifted one by one (or plural by plural) in a perpendicular direction which is perpendicular to the direction of the character string. In the second step, a position of the character string in the perpendicular direction is detected on a basis of the first projection data which is obtained through the first step (for example, on a basis of edges detected by using the first projection data). In addition, in the first step, the image data are divided into a plurality of segments in the direction of the character string and the first projection data in each of the segments are calculated. Therefore, even when image distortion occurs in the perpendicular direction, reduction of accuracy of the character string recognition can be prevented.

In other words, for example, when the character string is inclined diagonally, or when the character string is scanned in an inclined state, in a conventional character recognition method, the first projection data which are obtained through the first step are not formed in a steep waveform at edge portions of the character string but are formed in a gentle waveform. Accordingly, it is difficult to accurately detect the position of the character string in the perpendicular direction through the second step. However, according to the character string recognition method in accordance with an embodiment of the present invention, in the first step, the image data are divided into a plurality of segments in the direction of the character string and then the first projection data are calculated for each of the segments. Therefore, even when a character string is inclined diagonally, an adverse effect where the first projection data becomes a gentle waveform due to the inclination of scanning can be restrained and, as a result, reduction of accuracy of character string recognition can be prevented.

In accordance with the present invention, "character" in this specification includes not only general alphabets but also sign characters, decorated letters, pictorial symbols, barcodes, numerical characters, and any form and size may be applicable when they are visible on a medium.

SECOND EXAMPLE

The character string recognition method according to the first example, further comprises the steps of:

a third step in which a second projection data in the segment are calculated in the perpendicular direction on a basis of the position of the character string which is detected through the second step while shifting in the direction of the character string; and a fourth step in which a position where the second projection data obtained through the third step exceeds a threshold value is detected as a boundary position of a character included in the character string;

wherein the threshold value is changed according to pixel number between both ends of the character string which are detected by the second projection data.

According to the second example, the character string recognition method further comprises a third step in which a second projection data in the segment are calculated in the perpendicular direction while shifting in the direction of the character string on a basis of the position of the character string which is detected through the second step by, for example, paying attention to only peripheral pixels of the character string with the positions of the character string as a reference, and a fourth step in which a position where the second projection data obtained through the third step exceeds a threshold value is detected as a boundary position of a character which is included in the character string. In addition, according to the second example, the threshold value is changed according to the number of pixels between both ends of the character string which are detected by the second projection data. Therefore, a suitable threshold value can be set with a short time.

The threshold value used in the present invention is important in order to determine a boundary position of a character which is included in a character string. In accordance with an embodiment of the present invention, the threshold value is set on a basis of the second projection data which are automatically obtained through the third step, for example, on a basis of the number of pixels between both ends of the character string which are detected by the second projection data. Therefore, a suitable threshold value can be set with a short time.

THIRD EXAMPLE

The character string recognition method according to the second example, wherein the threshold value is made larger as the number of pixels between both the ends of the character string increases and the threshold value is made smaller as the number of pixels between both the ends of the character string decreases.

According to the third example, the threshold value is made larger as the number of pixels between both the ends of the character string increases and is made smaller as the number of pixels between both the ends of the character string decreases. Therefore, for example, when a relative moving speed of a medium is slow, the number of pixels between both ends of character string increases or resolution power becomes higher and thus the threshold value becomes larger. As a result, adverse influence of noise which is easily superposed at a low speed can be restrained. On the other hand, when a relative moving speed of a medium is fast, the number of pixels between both ends of the character string decreases or resolution power becomes lower and thus the threshold value becomes smaller. In this case, when a relative moving speed of a medium is fast, an output of the second projection data becomes small. Therefore, when the threshold value is maintained at a large constant value, a portion where an output of the second projection data becomes smaller is not detected as a portion which exceeds a specified threshold value and thus a recognition error occurs. However, in accordance with the embodiment of the present invention, since the threshold value is made smaller as described above, even a portion where an output of the second projection data becomes smaller is detected as a portion which exceeds a specified threshold value, and thus reduction of accuracy of character string recognition can be prevented.

FOURTH EXAMPLE

A character string recognition device comprises a character string recognition section for recognizing a character string on a medium by using the character string recognition method as set forth in the first through the third examples.

According to the fourth example, a character string recognition device is provided which includes a character string recognition section for recognizing a character string on a medium by using the character string recognition method described above.

Other features and advantages of the invention will be apparent from the following detailed description, taken in conjunction with the accompanying drawings that illustrate, by way of example, various features of embodiments of the invention.

DETAILED DESCRIPTION OF THE PREFERRED EMBODIMENTS

An embodiment of the present invention will be described below with reference to the accompanying drawings.

Figure 1:
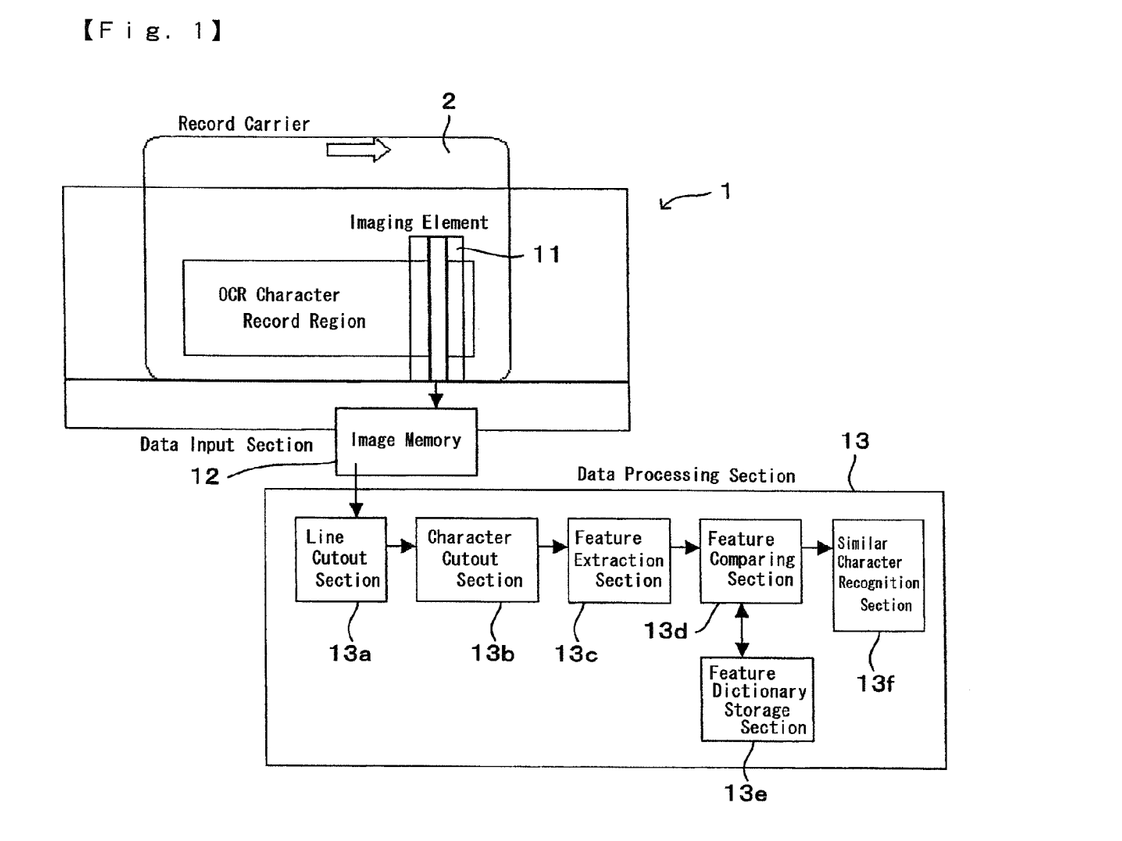
FIG. 1 is a block diagram showing an electrical structure of a character string recognition device in accordance with an embodiment of the present invention.

FIG. 1 is a block diagram showing an electrical structure of a character string recognition device 1 in accordance with an embodiment of the present invention.

In FIG. 1, the character string recognition device 1 includes a contact type (one dimensional) imaging element 11, an image memory 12 and a data processing section 13. The data processing section 13 includes a line cutout section 13a, a character cutout section 13b, a feature extraction section 13c, a feature comparing section 13d, a feature dictionary storage section 13e and a similar character recognition section 13f. These sections function as an example of a character string recognition section for recognizing a character string on a record carrier 2.

The imaging element 11 picks up image of an OCR character string on the record carrier 2 to perform photoelectric conversion of the OCR character string. Image data obtained by the imaging element 11 are taken into the image memory 12 temporarily. After that, the data processing section 13 reads out the image data from the image memory 12 to perform various processings in the respective sections and, finally, the OCR character string on the record carrier 2 is recognized.

The record carrier 2 may be general cards based on Japanese Industrial Standards "JIS", or a plastic card with a size of, for example, 86 mm length, 54 mm wide and 0.76 mm thickness, an identification card or a passport book.

In the character string recognition device 1 which is provided with an electrical structure described above, a schematic flow of a character string recognition method will be described first and, after that, a detail flow in accordance with an embodiment of the present embodiment will be described below.

Figure 2:
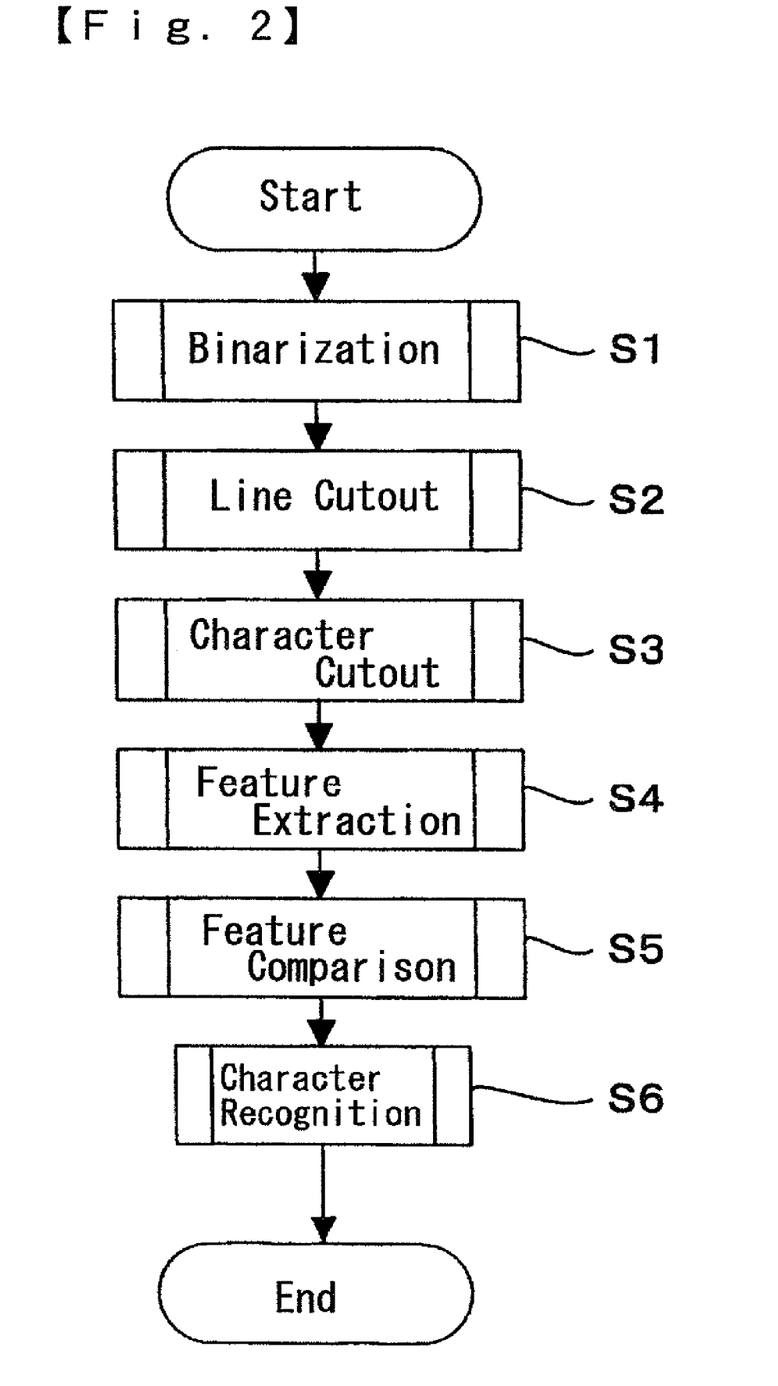
FIG. 2 is a flow chart showing a schematic flow of a character string recognition method in accordance with an embodiment of the present invention.

FIG. 2 is a flow chart showing a schematic flow of a character string recognition method in accordance with an embodiment of the present invention.

As shown in FIG. 2, in the character string recognition method in accordance with an embodiment of the present embodiment, first, binarization is performed (step S1). More specifically, the data processing section 13 reads out image data from the image memory 12 and, when the image data are multiple-gradation dark-and-light image, the image data are converted into binary image with black and white. The image memory 12 may utilize any memory which is capable of storing image data, such as a RAM, an SDRAM, a DDRS-DRAM or a RDRAM. Further, when binarization is to be performed, a threshold value has been determined by an appropriate method in advance. In subsequent processing, the black and white binarized image is used.

Next, a line cutout step is performed (step S2). More specifically, the line cutout section 13a in the data processing section 13 divides the binarized character string into a plurality of segments in a horizontal direction and projects pixels in the horizontal direction to detect upper and lower edges of the character string. After that, a center position between the upper and lower edges is identified as a center line of the character string and the line cutout step described in detail below is performed.

Next, a character cutout step is performed (step S3). More specifically, the character cutout section 13b in the data processing section 13 calculates projection perpendicularly, i.e., in a perpendicular direction for each segment of the image data for each character string which is detected in step S2. Then, a space between characters is discriminated by using a perpendicular projection profile which is obtained for each segment and cutout of a character which will be described in detail below is performed.

When processing of step S3 has been finished, a circumscribing rectangular region (upper/lower and right/left coordinate values) of a character which is an object to be recognized is obtained.

Next, a feature extraction step is performed (step S4). More specifically, the feature extraction section 13c in the data processing section 13 divides the circumscribing rectangular region into arbitrary sub-regions. For example, one circumscribing rectangular region is divided into 5×5 (five times five) regions and each of the regions is defined as a sub-region. In the respective sub-regions, a ratio of a black pixel number to all pixel number in the sub-region is obtained and a feature vector comprising the ratio as a factor is created.

Next, a feature comparison step is performed (step S5). More specifically, the feature comparing section 13d in the data processing section 13 compares the feature vector obtained through step S4 with reference feature vectors which have been obtained for all characters which are used in the medium in advance. As a result, a character with the highest similarity (for example, the highest normalization correlation coefficient) is set to be a corresponding candidate character to a character which is an object to be recognized.

The reference feature vectors have been stored in advance in the feature dictionary storage section 13e. In the feature comparison step, data of characters with higher similarity are read out from the feature dictionary storage section 13e to perform feature comparison.

Finally, a character recognition step is performed (step S6). More specifically, candidate characters which are set in the feature comparison step of the step S5 are recognized as characters which are used on the medium. When there is a plurality of candidate characters whose similarities are more than a predetermined value, character recognition cannot be performed. Therefore, in this case, in the similar character recognition section 13f, similar characters are distinguished from each other by using secondary feature quantities which are obtained from the feature vectors.

For example, the sub-region which may be arbitrarily divided is divided into two regions, i.e., a right side half region and a left side half region in a right and left line symmetrical manner to structure partial feature vectors and examine their similarities. Alternatively, the sub-region may be divided into two regions, i.e., an upper half region and a lower half region in an upper and lower line symmetrical manner to examine their similarities. Further, similarly to the right and left line symmetrical manner or the upper and lower line symmetrical manner, similarities may be examined in a point symmetrical manner.

Next, a detailed flow of a character string recognition method in accordance with an embodiment of the present embodiment will be described below.

Figure 3:
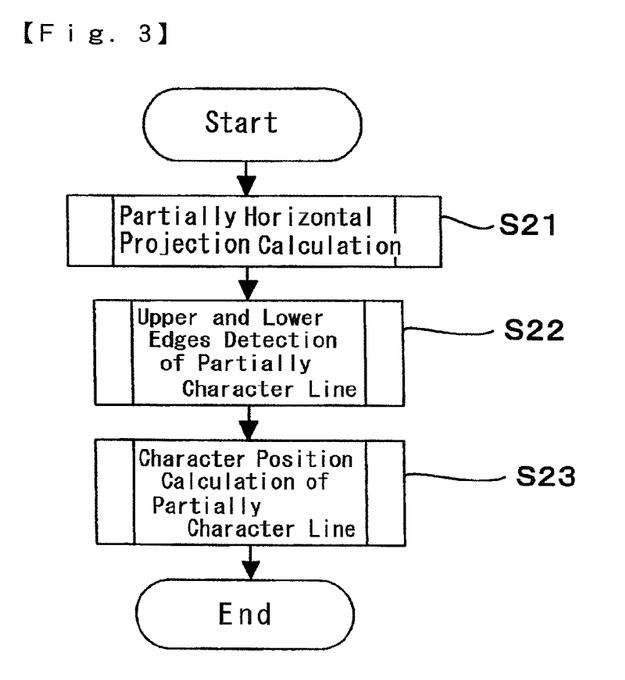
FIG. 3 is a flow chart showing a detailed flow of a line cutout step in the flow chart shown in FIG. 2.

FIG. 3 is a flow chart showing a detailed flow of the line cutout step (step S2) in the flow chart shown in FIG. 2.

First, a partially horizontal projection calculation step is performed (step S21). More specifically, the binarized image data are divided into a plurality of segments (in this embodiment, five segments of "A" through "E") in the character string direction. After that, projection data of the image data are calculated in the character string direction while shifting in a direction perpendicular to the character string direction (an example of the first step in accordance with an embodiment of the present invention).

Next, upper and lower edges detection of partially character line is performed as described below (step S22).

In the character string recognition method in accordance with an embodiment, it is one of its characteristics to divide a character string to five segments of "A" through "E". First, in order to compare the case where the character string is divided into several segments with a case where the character string is not divided into segments, a result of the "line cutout" step when the character string is not divided into segments will be described below.

Figure 4:
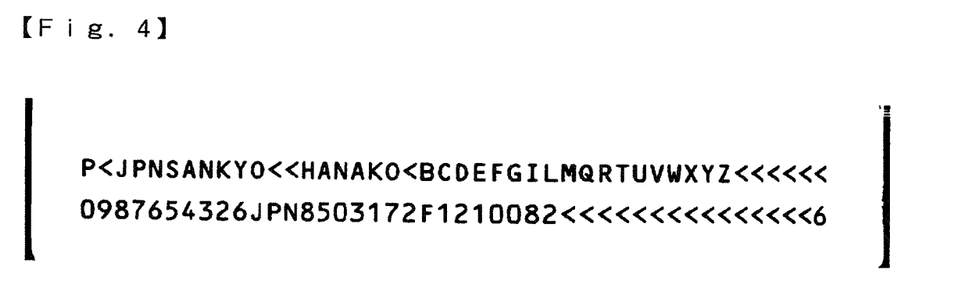
FIG. 4 is a view showing an example of image data when characters printed on an OCR character record region of a record carrier (see FIG. 1) are imaged.

FIG. 4 is a view showing an image data when characters printed on an OCR character record region of the record carrier 2 (see FIG. 1) are imaged.

Figure 5:
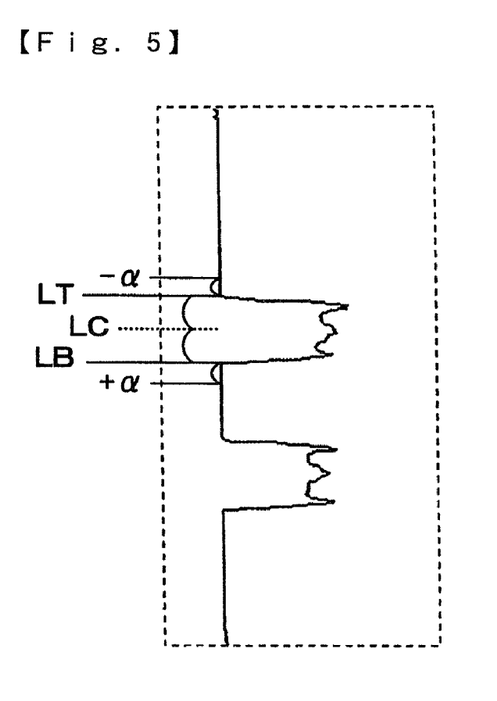
FIG. 5 is a view showing a first projection data when image data shown in FIG. 4 are projected in a character string direction.

In the image data shown in FIG. 4, when projection data of the image data are calculated in the character string direction, i.e., in a horizontal direction in FIG. 4 (density projection is performed to a Y-axis), a first projection data shown in FIG. 5 are obtained. In accordance with this embodiment, the density projection is a kind of histogram (density distribution diagram) in which pixels converted into the density of "1" or "0" by binarization are totaled according to the density, and either totaled value of white or black may be calculated.

FIG. 5 is a view showing the first projection data when image data shown in FIG. 4 is projected in the character string direction.

As shown in FIG. 5, the first projection data are formed in a waveform whose an upper and a lower edge portions of the character string are steep. Therefore, in this case, when the upper and the lower edge portions of the character string are going to be detected, positions in a direction perpendicular to the character string direction can be detected accurately.

In FIG. 5, first, in an upper side character string of two character strings, an upper end of the character string is set to be an upper side edge LT and its lower end is set to be a lower edge LB (>LT). In other words, in order to detect an upper and a lower edge of the character string, a position where pixels of Y-axis density projection have begun to be detected is set to be the upper side edge LT and a position where pixels have begun to be not detected is set to be the lower edge LB.

Next, a center position between the upper and the lower edges is calculated as a center position LC by using the upper and the lower edges LT and LB which are detected as described above. For example, the center position LC is obtained by using the following expression: LC=(LB+LT)/2. In the character string in which the center position LC is obtained, a line including the center position LC is temporarily determined as a center line of the character string. The center line is used as a reference position when an upper and a lower edge for each character are detected in the character cutout step described below.

As described above, when the first projection data shown in FIG. 5 are obtained, accurate positional detection in the direction perpendicular to the character string can be performed even when the character string is not divided into several segments.

Figure 6:
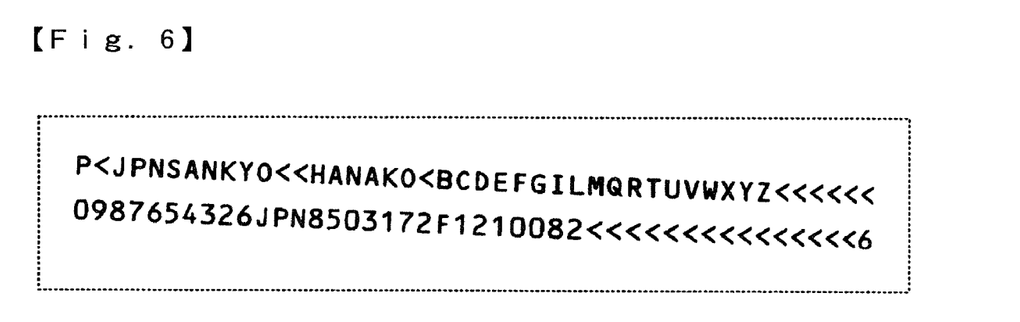
FIG. 6 is a view showing another example of image data when characters printed on the OCR character record region of the record carrier (see FIG. 1) are imaged.
Figure 7:
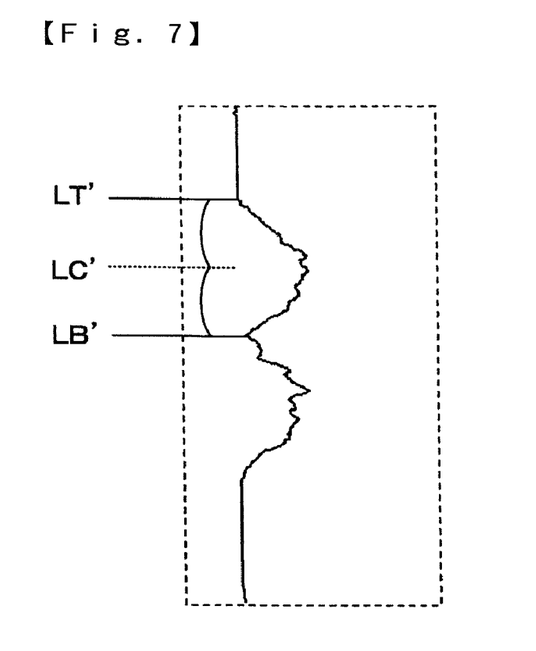
FIG. 7 is a view showing a first projection data when image data shown in FIG. 6 are projected in the character string direction.

However, for example, there may be a case when the first projection data shown in FIG. 6 are obtained, that is, the character string is inclined diagonally. In this case, when projection calculation of the first projection data shown in FIG. 6 is performed in the character string direction, a result shown in FIG. 7 is obtained. A profile of the first projection data shown in FIG. 7 is not formed in a waveform whose upper and lower edges of the character string are formed to be steep but is formed in a gentle waveform. Therefore, the upper and the lower edges LT' and LB' are determined at the positions shown in FIG. 7 and, In addition, the center position LC' is also determined at the position shown in FIG. 7. The positions of LT', LB' and LC' are shifted from the positions of LT, LB and LC and, especially, the following result is obtained; (LB'−LT')>(LB−LT). Therefore, accuracy for detecting the upper and the lower edges of the character string is reduced and, in addition, a distance between the upper and the lower edges of the character string is mistakenly detected longer and thus processing time for recognizing the character string becomes longer. Further, when an inclination of a medium is larger or, when an up-and-down motion during carrying of a medium is larger, two patterns obtained by the horizontal projection are interfered with each other and thus separation and discrimination of the character strings becomes even more inaccurate.

Figure 8:
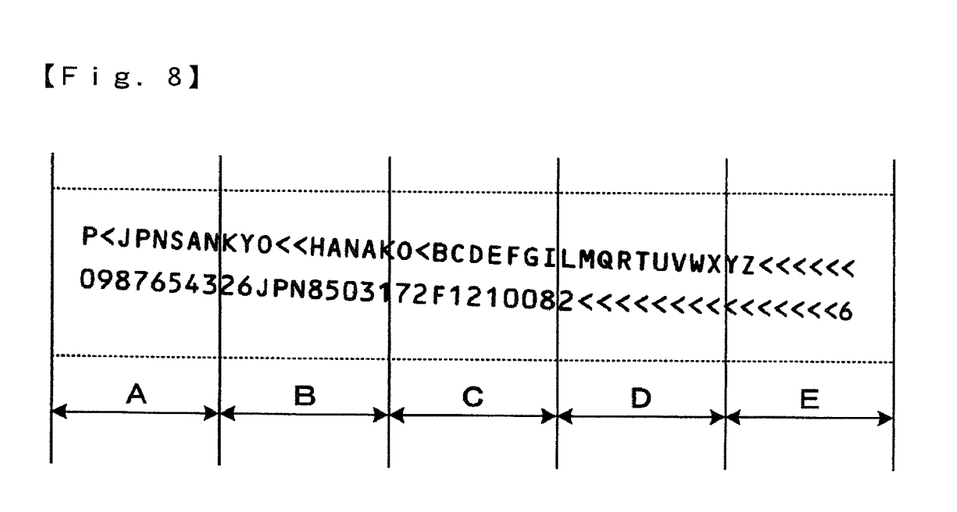
FIG. 8 is a view showing image data in which character strings are divided into five segments of "A" through "E"
Figure 9:
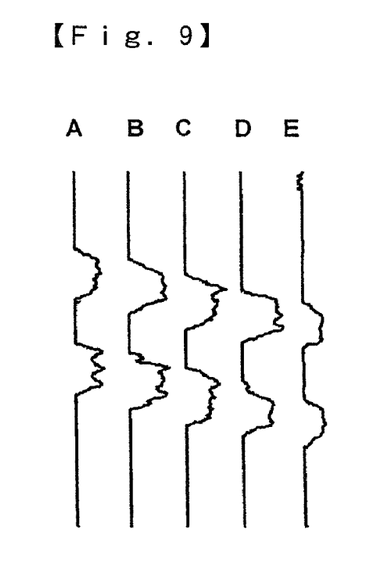
FIG. 9 is a view showing a first projection data when image data (for respective segments) shown in FIG. 8 are projected in the character string direction.

In order to solve the problem, in the character string recognition method in accordance with an embodiment of the present embodiment, as shown in FIG. 8, a character string is divided into five segments of "A" through "E". Therefore, since inclination lengths of the character string in the respective segments are shortened, when the first projection data are calculated, the results are obtained as shown in FIG. 9 (partially horizontal projection calculation step is performed: step S21). The first projection data shown in FIG. 9 are formed in waveforms whose upper and lower edges of the character string are formed to be steep. Accordingly, even when the character string is inclined diagonally, adverse effect of the first projection data which is formed in a gentle shape due to its inclination can be restrained. Specifically, the positions of the upper and the lower edges (positions of the character string in the perpendicular direction) can be accurately detected in comparison with the first projection data shown in FIG. 7 (upper and lower edges detection of partially character line is performed: step S22, an example of the second step in accordance with an embodiment of the present invention). In this manner, reduction of accuracy of the character string recognition can be prevented.

When the "character cutout" step which will be described below is performed, projection calculation is performed in the perpendicular direction of the character string. A calculating region for the projection calculation is determined in advance as follows. Specifically, as shown in FIG. 5, positions apart from the center position LC by half of the distance between the upper and the lower edges (LB−LT) and a predetermined quality of "α" are set to be search starting points. In other words, a position, which is obtained by subtracting half of the distance between the upper and the lower edges and the quality of "α" from the center position LC is set to be an upper side search starting point, and a position which is obtained by adding half of the distance between the upper and the lower edges and the quality of "α" to the center position LC, is set to be a lower side search starting point. Therefore, when projection calculation in the perpendicular direction of the character string is performed, projection data are calculated from the upper side search starting point to the lower side search starting point. Further, the "α" is an arbitrary numerical value and is determined so that all the upper and the lower edges of characters included in the character string are located between the upper side search starting point and the lower side search starting point.

Figure 10:
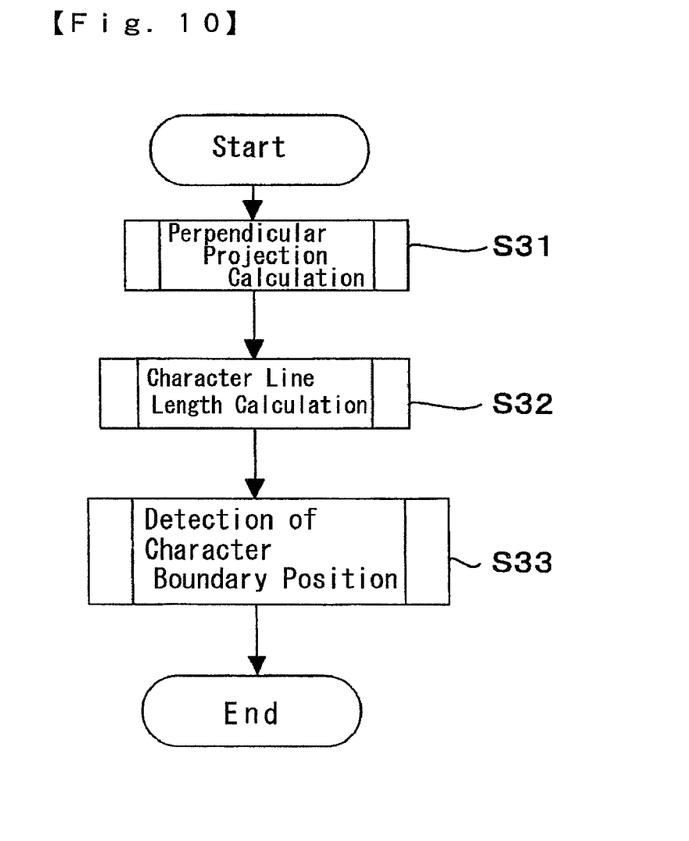
FIG. 10 is a flow chart showing a detailed flow of a character cutout step in the flow chart shown in FIG. 2.

FIG. 10 is a flow chart showing a detailed flow of a character cutout step (step S3) in the flow chart shown in FIG. 2.

First, perpendicular projection calculation is performed (step S31). More specifically, density projection is performed in the perpendicular direction of the character string to an X-axis while shifting the direction of the character string and second projection data are calculated (an example of the third step in accordance with an embodiment of the present invention). In this case, as described above, addition of pixels in the perpendicular direction is performed between the upper side search starting point and the lower side search starting point which are determined by the upper and lower edges obtained for each segment, i.e., ([LC−(LB−LT)/2−α]~[LC+(LB−LT)/2+α]).

Figure 11:
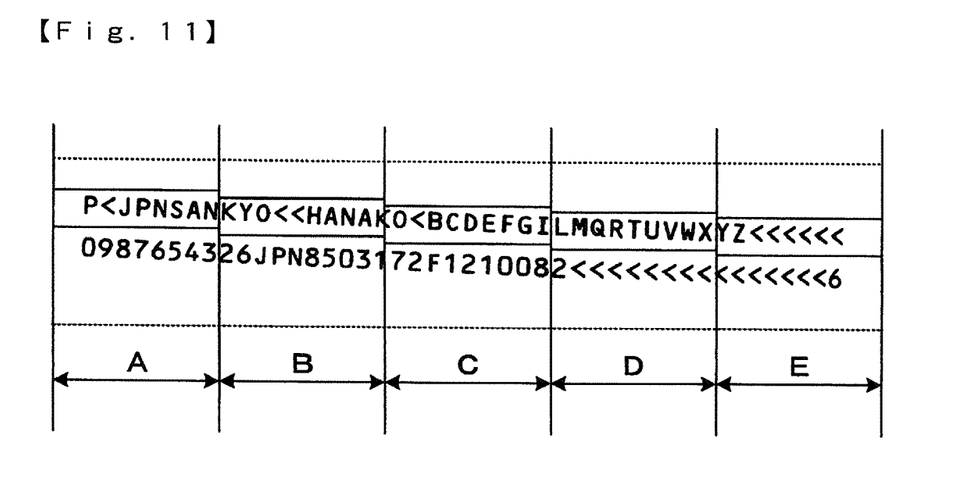
FIG. 11 is a view showing another example of image data when characters printed on the OCR character record region of the record medium (see FIG. 1) are imaged.

Specifically, as shown in FIG. 11, an adding region (rectangular frame) of pixels in the perpendicular direction is changed for the respective segments "A" through "E". In other words, in FIG. 11, widths of the adding regions (rectangular frame) of the respective segments "A" through "E" are not changed but their positions are respectively changed.

Figure 12:
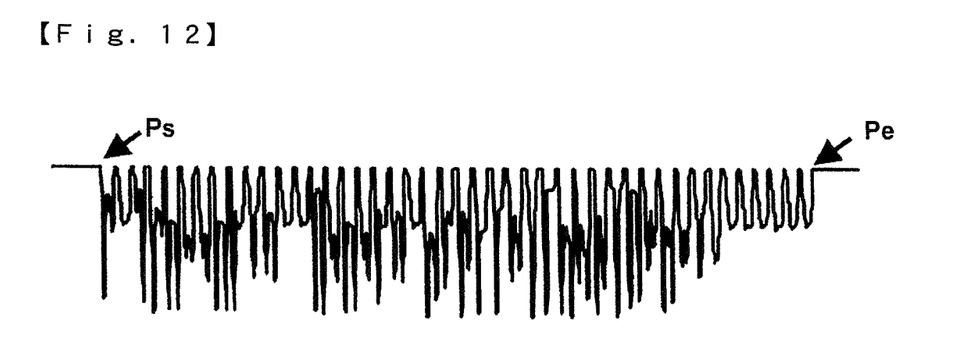
FIG. 12 is a view where a second projection data of the segments "A" through "E" are connected.

Next, a character line length is calculated (step S32). More specifically, the character line length is calculated according to a pixel number between both the search starting points of the character string which are detected by using the second projection data obtained in the step S31. FIG. 12 is a view where the second projection data of the segments "A" through "E" are connected. In FIG. 12, the character line length is obtained from the position of "Ps" to the position of "Pe" and a pixel number from the position of "Ps" to the position of "Pe" is equal to that between both ends of the character string.

The pixel number from the position of "Ps" to the position of "Pe" has a close relation to a speed at which a record carrier 2 is swiped. In other words, when a swipe speed is low, the pixel number is increased (sufficient resolution is obtained) but, when a swipe speed is high, the pixel number is reduced (sufficient resolution is not obtained).

Next, a character boundary position is detected (step S33). More specifically, since the second projection data obtained by the perpendicular projection include blank portions between characters structuring the character string, a portion where the second projection data exceed a specified threshold value is detected as a boundary position of a character which is included in the character string (an example of the fourth step in accordance with an embodiment of the present invention). This processing will be described in detail with reference to FIG. 13 and FIG. 14.

Figure 13:
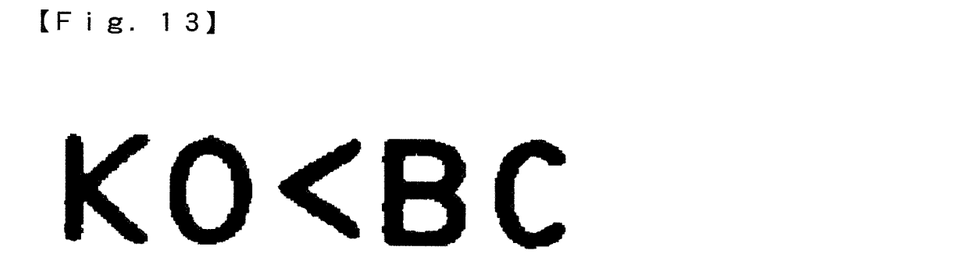
FIG. 13 is a view showing an example of image data of characters which are included in a character string.
Figure 14:
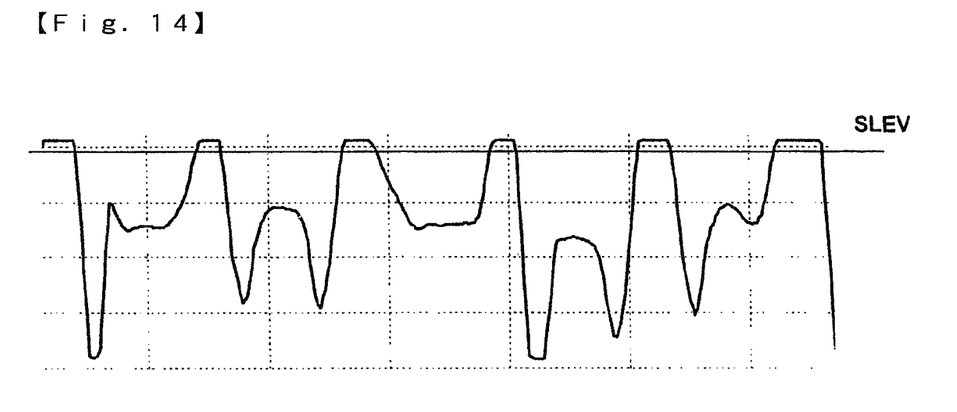
FIG. 14 is a view showing an example of a second projection data which are obtained by perpendicularly projecting the image data shown in FIG. 13.

FIG. 13 is a view showing image data of characters which are included in the character string. FIG. 14 is a view showing a second projection data which are obtained by perpendicularly projecting the image data shown in FIG. 13. FIG. 13 is a view showing image data from the character "K" to the character "C" in the segment "C" in FIG. 11.

In FIG. 14, blank portions between the respective characters correspond to portions where their respective levels exceed the level of "SLEV" (threshold value). Therefore, in the case shown in FIG. 14, pixels of the portions exceeding the level of "SLEV" (threshold value) are surely recognized as the pixels of blank portions. When a relative moving speed of a record carrier 2 is slow, a portion corresponding to a space between characters is provided with a sufficient brightness strength and a sufficient length and, further, a noise is easily superimposed when moved at a low speed, and thus the "SLEV" (threshold value) is set in a higher level.

Figure 15:
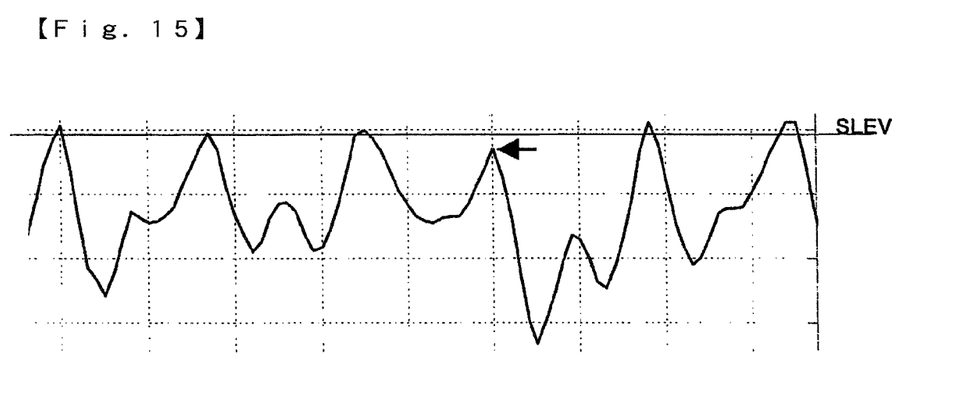
FIG. 15 is a view showing another example of a second projection data which are obtained by perpendicularly projecting the image data shown in FIG. 13.

However, when a relative moving speed of the record carrier 2 is high, resolution of image in the horizontal direction is reduced relatively and thus an output of a portion corresponding to a space between characters decreases. Specifically, in this case, a second projection data obtained by perpendicularly projecting the image data are, for example, shown in FIG. 15. In FIG. 15, since the output value of the portion shown by the arrow does not exceed the level of "SLEV" (threshold value), the portion is judged that it is not a space between characters although it is a space as shown in FIG. 14.

Therefore, in the embodiment of the present invention, the "SLEV" value (threshold value) is set as a function of a relative moving speed of a record carrier 2. In other words, as described above, the relative moving speed of the record carrier 2 is correlated with the pixel number between both the ends of the character string which is detected by the second projection data and thus the "SLEV" value (threshold value) is changed according to the pixel number.

Next, a calculation example of a threshold value will be described below. In this embodiment, "L" is a pixel number between both the ends of the character string, i.e., (Ps−Pe).

First, in consideration of a relative moving speed which is extremely low, an upper limit of the threshold value is set to be "SLEV=Amax (L≧Lmax)". Further, in consideration of a relative moving speed which is extremely high, a lower limit of the threshold value is set to be "SLEV=Amin (L≦Lmin)".

When the length "L" for a relative moving speed is larger than the "Lmin" and smaller than the "Lmax", the "SLEV" value is set to be as follow:

$$SLEV = A\min + Ad(L - L\min)/(L\max - L\min)$$

A function value "Ad" is a function which increases as the pixel number between both the ends of the character string increases, and which decreases as the pixel number between both the ends of the character string decreases. In other words, the function value "Ad" is a function which varies according to the pixel number between both the ends of character string. Alternatively, the function may utilize a function which varies according to a reduction rate of output values of spaces between characters or a generation rate of noise, and may utilize any function capable of obtaining a suitable threshold value. Further, the "Amin" and the "Amax" are determined so that spaces between characters can be stably detected.

In this manner, the upper and the lower edges of the respective characters are determined by the line cutout step (see step S2 in FIG. 2) and the right and the left boundary positions of the respective characters are temporarily determined by the character cutout step (see step S3 in FIG. 2). Therefore, as shown in FIG. 16, a character in an outer peripheral rectangular region is obtained.

Figure 16:
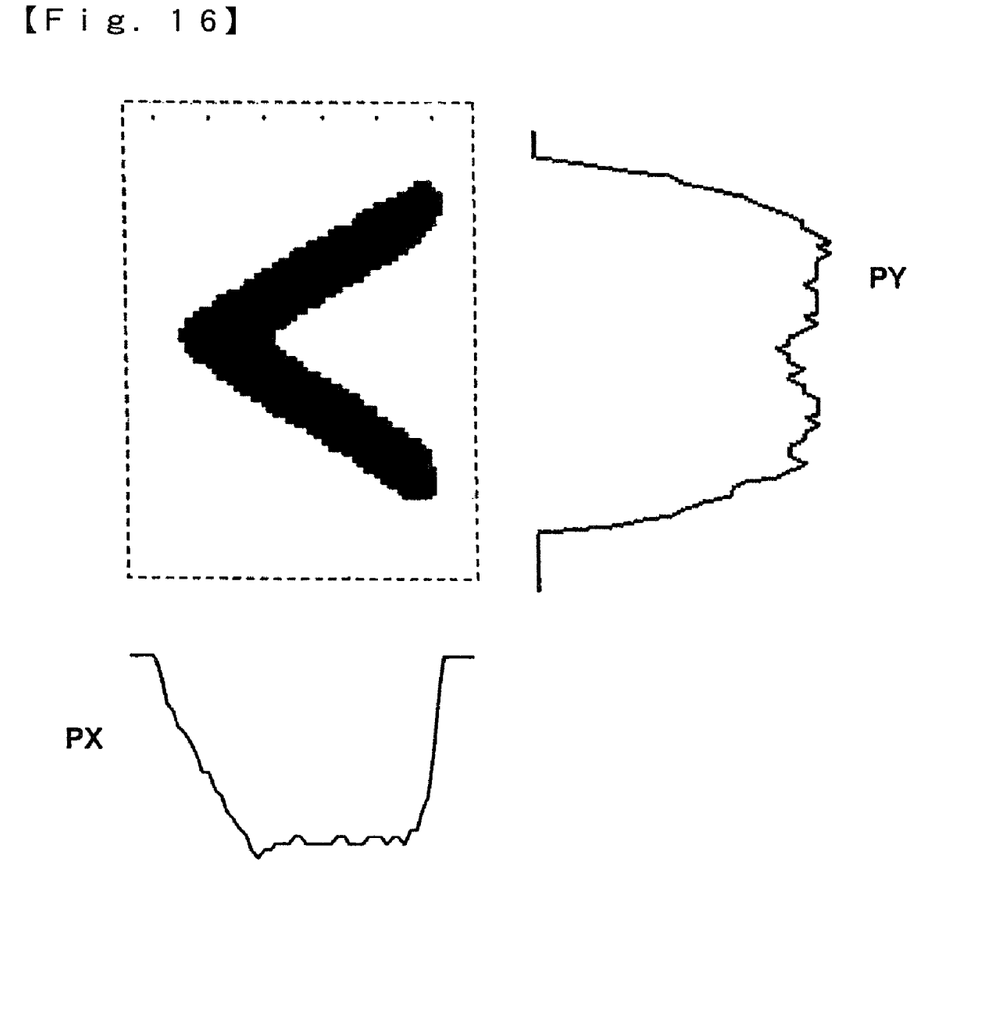
FIG. 16 is a view showing image data of a character "<" which is included in a character string.

FIG. 16 is a view showing image data of a character "<" which is included in a character string.

In FIG. 16, in order to accurately determine a position of the character "<", perpendicular projection "PX" and horizontal projection "PY" are calculated. In accordance with an embodiment, an adding region "λ" of pixel values in calculation of the perpendicular projection "PX" is set to be as follows by using values obtained in the character string cutout step.

$$LC-(LB-LT)/2-\alpha<\lambda<LC+(LB-LT)/2+\alpha$$

The right and the left boundary positions of a character are detected through the perpendicular projection "PX" which is obtained as described above. In other words, the perpendicular projection "PX" is scanned in the right direction with the left end point of the rectangular region as the starting point and, when a specified number of times (three times, for example) of level values (detection of pixels) becomes lower than the threshold value successively, the first position is set to be the left edge of the character. Also, the perpendicular projection "PX" is scanned in the left direction with the right end point of the rectangular region as the starting point and, when a specified number of times of level values becomes lower than the threshold value successively, the first position is set to be the right edge of the character. In this case, when the rectangular character region is located at a boundary of adjacent segments, for example, as shown in FIG. 11, the center position "LC" of the character string is set to be an average value of the center positions "LC1" and "LC2" of the two adjacent segments.

Next, similarly to the case of the perpendicular projection "PX", the horizontal projection "PY" is calculated over a region determined by the left edge position and the right edge position which are obtained in the character cutout step. In other words, the upper and the lower ends of the rectangular region are scanned from an outer side and, when a specified number of times of level values becomes lower than the threshold value successively, the first position is set to be the upper edge or the lower edge of the character.

In this manner, a character position in the character string is determined and a feature extraction is performed from the identified position (step S4 in FIG. 2) and then, a character recognition is performed (step S6 in FIG. 2).

As described above, according to the character string recognition method in accordance with an embodiment of the present embodiment, even when a character string is inclined diagonally, adverse effect that the first projection data are shaped in a gentle form due to its inclination can be restrained and, as a result, reduction of accuracy of a character string recognition can be prevented. Further, since the threshold value is changed according to the pixel number between both the ends of the character string, an accurate character recognition can be performed. Further, since the average speed can be easily detected, processing time can be shortened. In other words, the threshold value is determined by a function of a relative moving speed of a medium such that it is set to be a relatively small value when the medium is relatively moved at a high speed and set to be a relatively large value when the medium is moved at a low speed. Therefore, variation of a density level value due to a relative difference of image resolution which is occurred according to difference of the relative moving speed can be coped flexibly and thus a character recognition can be performed with a high degree of reliability.

In accordance with an embodiment, a linear feeding mechanism for a medium may be utilized. Further, in the embodiment described above, one dimensional imaging element 11 is used but the present invention is not limited to the embodiment. For example, a combination of an area sensor such as two-dimensional CCD or a CMOS imager and a support mechanism for an object to be imaged may be applicable. Further, printing type characters and hand written characters can be used as a recognition object. Further, the present invention is not limited to character recognition and can be applied to decoding of one-dimensional or two-dimensional bar-code or the like.

The character string recognition method and the character string recognition device in accordance with the present invention may be effective when they are utilized in applications for preventing reduction of accuracy of a character string recognition.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A character string recognition method for recognizing a character string comprising the steps of:
    imaging a character string on a medium to obtain image data;
    a first step in which:
        a first projection data of the image data are calculated in a direction of the character string while shifting in a perpendicular direction which is perpendicular to a direction of the character string; and
        the image data are divided into a plurality of segments in the direction of the character string and projection in each of the plurality of segments is calculated;
    a second step in which a position of the character string in the perpendicular direction is detected on a basis of the first projection data which are obtained through the first step;
    a third step in which a second projection data in the segment in the perpendicular direction are calculated on a basis of the position of the character string which is detected through the second step while shifting in the direction of the character string; and
    a fourth step in which a position where the second projection data obtained through the third step exceeds a threshold value is detected as a boundary position of a character included in the character string;
    wherein the threshold value is made larger as the pixel number between both ends of the character string increases and the threshold value is made smaller as the pixel number between both ends of the character string decreases.

2. The character string recognition method according to claim 1, further comprising the steps of:
    wherein the threshold value is changed according to pixel number between both ends of the character string which are detected by the second projection data between a lower limit of the threshold value and an upper limit of the threshold value.

3. A character string recognition device comprising:
    a character string recognition section for recognizing a character string on a medium by using the character string recognition method as set forth in claim 1.

4. The character string recognition device according to claim 3;
wherein the character string recognition section is further configured to change the threshold value according to pixel number between both ends of the character string which are detected by the second projection data between a lower limit of the threshold value and an upper limit of the threshold value.

* * * * *